United States Patent [19]

De Buyser

[11] Patent Number: 5,880,266
[45] Date of Patent: Mar. 9, 1999

[54] PROTEIN PRODUCT FROM BLOOD AND/ OR HEMOGLOBIN

[75] Inventor: Dirk R. De Buyser, Zedelgem, Belgium

[73] Assignee: Veos N.V., Zwevezele, Belgium

[21] Appl. No.: 821,809

[22] Filed: Mar. 21, 1997

[30] Foreign Application Priority Data

May 15, 1996 [EP] European Pat. Off. .............. 96201346

[51] Int. Cl.$^6$ ............................. A61K 35/14; A23J 1/02
[52] U.S. Cl. ..................... 530/385; 530/380; 530/386; 530/412; 530/419; 530/420; 426/657
[58] Field of Search .................................. 530/385, 380, 530/386, 412, 419, 420; 426/657

[56] References Cited

U.S. PATENT DOCUMENTS

| | | | |
|---|---|---|---|
| 4,180,592 | 12/1979 | Buckley et al. | 426/32 |
| 4,376,727 | 3/1983 | Sato et al. | 530/385 |
| 5,151,500 | 9/1992 | Wismer-Pedersen et al. | 530/385 |

FOREIGN PATENT DOCUMENTS 0 397 890   11/1990   European Pat. Off. .
0 460 219 A1   12/1991   European Pat. Off. .

OTHER PUBLICATIONS

Derwent Abstract of JP–A–63 044 599, Section Ch, Week 8814, Class D13, AN 88–094651, 28 Feb. 1988.
Autio et al, *Journal of Food Science*, vol. 49, pp. 859–862, 1984.

*Primary Examiner*—Cecilia J. Tsang
*Assistant Examiner*—Abdel A. Mohamed
*Attorney, Agent, or Firm*—Maria Parrish Tungol

[57] ABSTRACT

The invention relates to new protein derivatives of blood, blood-protein containing raw materials and hemoglobin, and more particularly to processed globin products, and to processes for producing these products. The processed globin products have an isoelectric point at a pH value below 5.5, an iron content of less than 1000 ppm, a ratio of His : Lys between 0.6 and 1.5, a Tyrosine content of at least 0.5% by weight, a Methionine content of at least 0.5% by weight, and a Lysine content of at least 5% by weight. The method for the production of the processed globin products according to the invention comprises treating the starting material at a pH above 12 and an the oxidizing treatment step the pH is kept below 12 while maintaining the temperature below 50° C.

18 Claims, No Drawings

PROTEIN PRODUCT FROM BLOOD AND/OR HEMOGLOBIN

TITLE OF THE INVENTION

This invention relates to new protein products and to methods for preparing said new protein products. In particular the invention relates to new protein derivatives of blood, blood-protein containing raw materials and hemoglobin, and more particularly to processed globin products.

The invention further relates to processes for producing these products.

BACKGROUND OF THE INVENTION

Large quantities of blood from slaughterhouses are sent to working-up plants, where the blood is processed into dried blood products which are primarily used in fodder mixtures for livestock, or where it is fractionated to recover the blood plasma for use in all kinds of food products. The major part of the valuable protein content, present in the hemoglobin fraction of whole blood, is however currently used mainly as an animal feed additive since minor amounts of hemoglobin impart an undesirable dark colour and an unpleasant odour and taste to food products. Other factors that limit the use of blood products in food or even as a additive to animal feed are their high iron contents and their insufficient functional properties.

Over the years, various attempts have been made to remove the iron from whole blood and blood fractions, in particular from the hemoglobin fraction, and to decolourize the product.

Danish Patent Application No. 5508/86 discloses a process for producing decolourized hemoglobin by mechanical opening of the blood cells, adjusting the pH to 1 of 2 by means of an acid and adding 1 to 5% by weight / volume of an oxidising agent, in particular hydrogen peroxide, in the presence of carbohydrate derivative containing dienol groups, such as ascorbic acid. After oxidation, side products such as cell debris and heme-groups are removed and the decolourized protein fraction is recovered.

In European Patent Application No. 148 114, a process for producing decolourized hemoglobin is disclosed that encompasses treating whole blood in the presence of a proteolytic enzyme at a pH of 3.5 to 4 to denature the globin chains and thus render the heme-group more accessible to the action of an oxidising agent.

U.S. Pat. No. 4,180,592 discloses decolorization of blood by treating blood with an excess, e.g. 3 to 6% by weight, of an oxidising agent such as hydrogen peroxide after which excess hydrogen peroxide is removed by adding a further amount of blood.

The currently known methods apparently aim at separating the heme-group from the globin fraction either starting from whole blood or from the hemoglobin fraction.

These known methods aim at reducing the taste, odour an colour drawbacks of the resulting protein products by substantially removing the iron / heme fraction from the product. These methods however are still unsatisfactory either in that they require large amounts of oxidising agents, which affects the production costs as well as the properties of the protein products due to the oxidative action on sulfur containing amino acids such as Cystin, Cystein, Histidin and Methionin, and/or require rather expensive process adjuvents to avoid the latter drawbacks, in that they yield protein products having properties which are still not optimal in respect of taste, odour and colour or in that they yield protein products having low functionalities.

A totally different approach to processed hemoglobin products is known from EP 0 460 219. This patent discloses processed hemoglobin having an iron content of not less than 2 mg per g of solid content resulting from treating washed hemoglobin under alkaline conditions and treating the resulting product under oxidizing conditions.

However, a very important drawback of globin protein products known in the art is that they all have an isoelectric point in the range of 6–7, which isoelectric point corresponds to the isoelectric point of the hemoglobin.

This fact considerably affects the application possibilities in food products of the currently available blood protein and globin protein products. The solubility of proteins is indeed very low at their isoelectric point and food products usually have a pH value ranging from 5 to 9. In particular processed meat products have a pH value ranging from 5.5–7.0.

The purpose of the present invention is to provide a new globin protein product having properties and characteristics unknown before in the art, in particular a bland, colorless protein product with a solubility pattern, emulsifying capacity, emulsion stability and waterbinding properties similar to those of caseinates, in particular to those of the so called "high viscous type" caseinates, and to those of other functional proteins such as soy isolates.

SUMMARY OF THE INVENTION

To that purpose the invention provides a new protein product defined as a processed globin product having an iso-electric point at a pH value below 5.5.

According to a preferred feature of the invention said processed globin product has an iron content of less than 1000 ppm, preferably less than 500 ppm.

According to further preferred features of the invention, the new processed globin products have at least one of the following characteristics, separately or in combinations:

a ratio of His : Lys between 0.6 and 1.5 preferably between 0.8 and 1.0, a Tyrosine content of at least 0,5% by weight.

a Methionine content of at least 0,5% by weight.

a Lysine content of at least 5% by weight.

Most preferred processed globin products according to the invention have an iso-electric point at a pH value in the range from 4 to 5.

The most preferred processed globin products according to the invention may furthermore most suitably present an amino acid composition substantially satisfying the following ranges (expressed as weight percent of the total weight of aminoacids in the protein product):

| | |
|---|---|
| Asp + Asn | 12.00–13.50 |
| Glu + Gln | 8.50–9.50 |
| Thr | 3.00–4.00 |
| Ser | 4.50–5.50 |
| Gly | 4.50–5.50 |
| Ala | 8.30–9.30 |
| Cys | 0.60–0.90 |
| Met | 0.60–0.90 |
| Val | 9.90–10.90 |
| Ile | 0.50–0.60 |
| Leu | 13.90–14.90 |
| Tyr | 0.80–2.50 |
| Phe | 6.80–7.80 |
| Arg | 3.80–4.80 |
| His | 6.50–7.50 |

| | |
|---|---|
| Lys | 6.50–9.00 |
| Pro | 3.00–4.00 |
| | 100,00 |

It is a further purpose of the invention to provide a novel method for processing blood and blood protein containing materials which avoids many drawbacks of known processes and which yields bland, colorless protein products with a solubility pattern, emulsifying capacity, emulsion stability and waterbinding properties such that these protein products can be used as replacers for caseinates, in particular of the so called "high viscous type" caseinates, or for other functional proteins such as soy isolates.

In particular the further purpose of the present invention is to provide a method which allows to eliminate, as much as possible, the iron from whole blood or from the hemoglobin fraction of whole blood, which allows to obtain a globin protein product which does not impart an objectional smell and taste to the food products for which it is intended, which allows to preserve as much as possible the nutritional value of the globin protein product by limiting oxidation of amino acids which readily oxidise in the presence of e.g. hydrogen peroxide, and which allows to obtain a globin protein product which has functional properties similar to caseinates, i.e. having water-binding properties, high solubility in a pH range from 5 to 9, and excellent emulsifying capacity and emulsion stability.

DETAILED DESCRIPTION OF THE INVENTION

The invention accordingly provides a method for the production of processed globin from a starting material selected from blood, blood-protein containing raw materials and haemoglobin, comprising the steps of treating the starting material under alkaline conditions and treating the resulting product under oxidizing conditions, wherein in the alkaline treatment step the pH is brought above 12, preferrably above 12.5, while maintaining the temperature below 50° C., preferably at ambient temperature or even below, such as around 15° C., and wherein in the oxidizing treatment step the pH is kept below 12, preferably between 9 and 12, most preferably around 10.5, and the temperature is maintained below 50° C., preferably at ambient temperature.

To adjust the pH to the required value in the alkaline treatment step, ammonia or any alkali may be added to the aqueous suspension in particular a strong alkali, preferably in diluted form, such as a strong inorganic alkali such as sodium and potassium hydroxide, or calcium hydroxide.

It has also been found most convenient for carrying out the present process that the protein concentration of the suspension is not too high. Therefore, the whole blood or the hemoglobin fraction of whole blood is preferably suspended in one to ten times its volume with water.

The alkali treatment is allowed to proceed for a period for at least 10 minutes depending upon the isoelectric point of the globin protein product aimed at.

According to a preferred feature of the invention, in the alkaline treatment step of the new method, the pH is preferably maintained above 12 during at least 15 minutes, preferably during up to 2 hours.

According to another preferred feature of the invention the oxidizing treatment step of the new method is applied by adding an oxidant, such as preferably hydrogen peroxide, during a period of 0.1 to 24 hours, preferably at least 30 minutes, most preferably between 60 and 90 minutes.

When using the most preferred oxidant (hydrogen peroxide), the rate of addition is suitably choosen between 0.01 and 500 l $H_2O_2$ per 1000 l of reaction medium per hour.

Such a mild oxidation hardly affects the globin protein and apparently only selectively oxidises the heme-globin linkage to free the iron containing moiety that can easily be removed from the suspension of the whole blood or hemoglobin fraction thereof, e.g. by filtration, centrifugation or ion exchange.

Alternative oxidising agents may e.g. be selected from the group of sodium peroxide, calcium peroxide, potassium peroxide, oxygen, ozone, nitrates and the like, however, the choice of the oxidisng agent will of course depent on the intended use of the globin protein product. When the product is to be incorporated in a product intended for human consumption, oxidising agents like hydrogen peroxide are largely preferred.

According to a preferred embodiment of the invention the process steps mentioned above are appropriately followed by a further step whereby the iron containing component(s) is/are removed.

This can for instance be achieved by ultrafiltration, ion exchange or by filtration, sedimentation or centrifugation after addition of substances containing bivalent ions such as $Ca^{2+}$.

Upon removal of the iron-containing moiety, a brown iron-depleted globin protein suspension is obtained.

Optionally, in a subsequent stage, the brown iron-depleted globin protein suspension is decolorised by the addition of an oxidising agent such as hydrogen peroxide at a concentration of 0,01–500 l $H_2O_2$ per 1000 l of protein suspension and heat treated at 50° C.–150° C. during 1 second—48 hours, preferably at approximately 140° C. during approximately 4 seconds. This mild oxidation prevents the oxidation of essential amino acids such as Methionine and subsequent protein damage.

In the next stage, the solution of globin proteins can be dried through e.g. spray-drying to yield a powder or even further refined through selective precipitation of the globin protein by lowering the pH of the suspension to the isoelectric point of the globin protein and washing of the precipitate.

The oxidation of the iron—heme-group linkage in the second stage according to the preferred embodiment is preferably carried out at a temperature below 50° C. to ensure that the oxidising agent does not significantly affect the protein as such.

According to the invention the protein product can be recovered, isolated and further purified by filtration (including diafiltration, membrane filtration, vacuumfiltration, ultrafiltration, etc.), decantation, centrifugation, etc., and the isolated globin product may optionally be dried by e.g. fluid-bed drying, freeze-drying, spray-drying etc.

These techniques are carried out in a manner know per se using conventional methods and apparatus Preferably, the globin protein products are further refined by selective precipitation of the protein from the protein suspension, by lowering the pH of the suspension to about the isoelectric point of the protein and recovering the precipitate. This precipitate may then be washed several times and further dried in a manner known per se.

Preferably, the suspension of the globin protein product is treated with a catalase enzyme solution, that hydrolyses the residual hydrogen peroxide into water and oxygen, prior to filtration, drying or precipitation, in order to prevent oxidation of the aminoacids, particularly when the globin protein product is destined for human nutrition.

The product can be obtained and/or distributed as solution or suspension (either in the liquid state or preferably frozen), as concentrate, in dried form or in whatever suitable form known per se.

The invention further also extends to edible products comprising protein products in accordance with the invention and/or blood derivatives obtained by a method in accordance with the invention The invention will be explained hereafter in more detail by means of the following examples, given solely for illustrative purposes, without in any way limiting the invention to any of the specific details described in these examples.

EXAMPLE 1

Treatment of hemoglobin fraction in accordance with the method of the invention.

1 part by weight of the hemoglobin fraction of pig blood was dispersed in 7 parts by weight of water at 15° C. The pH of the mixture was brought to a value of 12.5 by adding a solution of Sodium hydroxide at a concentration of 28Bé, and the mixture was maintained at that pH at 15° C. for 2 hours.

The mixture was then brought to a pH of 10,5 using a 3M $H_2SO_4$ solution.

The pH was maintained at 10.5 for 1 hour, at room temperature, while progressively adding hydrogen peroxide, in a total amount of 0.5 part of $H_2O_2$ per part of hemoglobin. The obtained suspension was then separated into a globin protein solution and an iron-containing moiety by ultrafiltration. The iron-depleted globin protein suspension is further decolorised by adding 0.01 part of $H_2O_2$ per part of hemoglobin and heat treated at 140° C. during 4 seconds.

The decolorised globin protein solution was treated with catalase to neutralise the hydrogen peroxide and the globin protein was isolated by bringing the obtained iron-depleted decolorised globin protein solution to the iso-electric point of the globin protein, i.e. to pH-4.5 and by subsequent centrifugation.

After washing of the precipitated globin protein and resolubilisation by addition of an alkali such as NaOH to pH-7.00 the solution is subsequently spraydried to yield a white processed globin product.

EXAMPLE 2

Processed globin product according to the invention.

The processed globin product of example 1 showed the following chemical analysis:

Protein content (Kjeldahl - N×6.25) on dry matter: 90–98%

Ash content : 3–10%

Fat 0.5–1.5% pH (10% solution) : 7–9

Solubility (1% solution) : >99%

Fe-content : <500 ppm

The amino acid profile of said globin product was as shown in table I (column 4), and as compared with that of typical commercial products.

|  | Plasma | Haemogl | Blood | Globin | Na-caseinate | Soy-isolate |
|---|---|---|---|---|---|---|
| Asp/Asn | 10.4 | 12.1 | 11.7 | 13.3 | 7.5 | 12.7 |
| Thr | 7.0 | 3.6 | 4.3 | 3.7 | 4.9 | 4.2 |
| Ser | 7.3 | 4.4 | 5.1 | 5.2 | 6.3 | 5.6 |
| Glu/Gln | 13.8 | 8.9 | 10.0 | 9.2 | 23.1 | 20.4 |
| Gly | 3.6 | 4.9 | 4.6 | 5.0 | 2.1 | 4.6 |
| Ala | 4.9 | 9.0 | 8.1 | 8.9 | 3.2 | 4.6 |
| Cys | 3.1 | 0.8 | 1.3 | 0.9 | 0.4 | 1.4 |
| Val | 7.3 | 10.1 | 9.5 | 10.4 | 7.1 | 5.2 |
| Met | 1.2 | 0.8 | 0.9 | 0.8 | 2.9 | 1.4 |
| Ile | 3.1 | 0.6 | 1.2 | 0.6 | 5.7 | 5.0 |
| Leu | 9.5 | 13.9 | 12.9 | 14.5 | 10.0 | 8.5 |
| Tyr | 5.2 | 2.3 | 3.0 | 1.4 | 6.1 | 3.4 |
| Phe | 5.5 | 7.3 | 6.9 | 7.3 | 5.5 | 5.4 |
| Lys | 9.2 | 9.3 | 9.3 | 7.5 | 8.5 | 7.0 |
| His | 3.0 | 7.5 | 6.5 | 6.9 | 3.1 | 2.8 |
| Arg | 5.8 | 4.3 | 4.7 | 4.4 | 3.9 | 7.9 |
|  | 100.0 | 100.00 | 100.00 | 100.00 | 100.00 | 100.0 |

The viscosity of a 15% dispersion of the globin product of example 1 at 20° C., as measured with a Brookfield viscosimeter with spindle 4, at 0.3 rpm, was measured as 10–20.000 poise (as compared to high viscous caseinates which show a value of approx. 15,000 poise, and to a typical soy isolate which also shows a value of approx. 15,000).

EXAMPLE 3

Emulsifying capacity and emulsion stability of a processed globin product according to the invention.

The emulsifying capacity of the globin product of example 1 is illustrated by the preparation of a protein/water/fat emulsion.

A typical cold emulsion was prepared using 457 parts by weight of animal fat, 457 parts by weight of water, 66 parts by weight of the globin of example 1 and 20 parts by weight of sodium chloride.

A typical warm emulsion was prepared using 467 parts by weight of animal fat, 467 parts by weight of water, 46 parts by weight of the globin of example 1 and 20 parts by weight of sodium chloride.

This corresponds to a protein/water/fat proportion of 1/7/7 for cold emulsions and 1/10/10 for warm emulsions, which compares very favourably with the protein/water/fat proportions for cold emulsions of respectively soy isolate and high viscous caseinate (1/5/5 respectively 1/7/7) and the protein/water/fat proportions for warm emulsions of respectively soy isolate and low viscous caseinate (1/6/10 respectively 1/5/5), measured according to "L'Encyclopedie de charcuterie J. C. Frentz, Soussana, 1982.

Heating the emulsions, prepared with the globin product of example 1, to 100° C. or even to 120° C. during 1 hours keeps the stable emulsion unaffected.

EXAMPLE 4 and 5

Edible products containing globin products according to the invention.

Processed meat products were prepared using general procedures as described in "L'Encyclopedie de charcuterie", J. C. Frentz, Soussana, 1982.

All amounts stated are in parts by weight.

EXAMPLE 4 : "Pâté"- preparation.

| Composition | pork liver | 300 |
| --- | --- | --- |
| | soft fat | 480 |
| | whole egg | 50 |
| | milk at 60° C. | 120 |
| | Globin | 10 |
| | Onion | 10 |
| | Ingredients & | 30 |
| | Additives | |
| | | 1000 |

Ingredients & additives : nitrite salt : 18—herbs : 5—polyphosphates : 2—ascorbic acid 0.3 dextrose 5.
Preparation method
The liver, globin, egg, onion, herbs, nitrite salt, polyphosphates and extrose were place in a cutter/mixer in the stated order. the cutter operated until a fine meat emulsion was obtained. Then the soft fat and milk at 60° C. were added, followed by ascorbic acid dissolved in water.
The meat emulsion was filled off in pots and cooked at a temperature of 80° C.
Taste panel results
The pâté is of good taste, odour and colour and could practically not be distinguished from one with sodium caseinate.

EXAMPLE 5 : "Strasbourg" sausage.

| Composition | lean trims (pork) | 190 |
| --- | --- | --- |
| | lean trimmings (bovine) | 190 |
| | hard fat | 110 |
| | jawl (pork) | 130 |
| | ice | 190 |
| | 1/7/7 fat emulsion with globin (see example 2) | 150 |
| | inyredients and additives | 40 |
| | | 1000 |

Ingredients and additives Nitrite salt : 18—polyphosphates : 3—dextrose : 3—ascorbic acid : 0,3—lactose : 5—blanc pepper : 2—muscade 1—coriander 2—red pigment 1—garlic 4.
Preparation method
All ingredients were placed in a cutter/mixer in the order as outlined in the composition.
The meat emulsion was filled off in natural casing and put in a steam chamber (50° C.) during 1 hour, smoked at 55° C. during 1 hour and cooked in a steam chamber at a temperature of 75° C. during 20 minutes.
Taste panel results :
The sausages are of excellent taste, odour and colour and could practically not be distinguished from those made with sodium caseinate.

I claim:

1. Processed globin product derived from blood, hemoglobin or blood-protein containing raw materials wherein the product has an isoelectric point at a pH value below 5.5.

2. Processed globin product according to claim 1, having an iron content of less than 1000 ppm.

3. Processed globin product according to claim 1, having a ratio of His : Lys between 0.6 and 1.5.

4. Processed globin product according to claim 1, having a Tyrosine content of at least 0.5 % by weight.

5. Processed globin product according to claim 1, having a Methionine content of at least 0.5 % by weight.

6. Processed globin product according to claim 1, having a Lysine content of at least 5% by weight.

7. Processed globin product according to claim 1, having an iso-electric point at a pH value in the range from 3 to 5.5.

8. Processed globin product according to claim 1, having an isoelectric point at a pH value in the range between 4 and 5.

9. Processed globin according to claim 1, comprised of the following amino acids:

| Asp + Asn | 12.00–13.50% by weight |
| --- | --- |
| Glu + Gln | 8.50–9.50% by weight |
| Thr | 3.00–4.00% by weight |
| Ser | 4.50–5.50% by weight |
| Gly | 4.50–5.50% by weight |
| Ala | 8.3–9.3% by weight |
| Cys | 0.60–0.90% by weight |
| Met | 0.60–0.90% by weight |
| Val | 9.90–10.90% by weight |
| Ile | 0.50–0.60% by weight |
| Leu | 13.90–14.90% by weight |
| Tyr | 0.80–2.50% by weight |
| Phe | 6.8–7.8% by weight |
| Arg | 3.8–4.8% by weight |
| His | 6.5–7.5% by weight |
| Lys | 6.5–9.0% by weight |
| Pro | 3.0–4.0% by weight | wherein the % by weight is based on the total weight of amino acids in the globin product.

10. Processed globin product according to claim 1, having:
    an isoelectric point at a pH value in the range between 4 and 5;
    an iron content of less than 1000 ppm; a ratio of His : Lys between 0.6 and 1.5;
    a Tyrosine content of at least 0.5% by weight;
    a Methionine content of at least 0.5% by weight;
    a Lysine content of at least 5% by weight.

11. A process of preparing edible food products comprising mixing a food product with a processed globin according to claim 10.

12. Processed globin product derived from starting material selected from the group consisting of blood, blood-protein containing raw materials and hemoglobin, wherein the globin product has an isoelectric point at a pH value in the range from 3 to 5.5, wherein the product is produced by a process comprising the steps of treating the starting material under alkaline conditions and treating the resulting product under oxidizing conditions, wherein
    in the alkaline treatment step the pH is brought above 12, while maintaining the temperature below 50° C.,
    in the oxidizing treatment step the pH is kept below 12 and the temperature is maintained below 50° C.

13. Processed globin products according to claim 12 wherein iron containing components are removed after the oxidizing treatment step.

14. A process of preparing edible food products comprising mixing a food product with a processed globin according to claim 13.

15. Processed globin products according to claim 12 wherein the pH is kept above 12 for at least 15 minutes in the alkaline treatment step.

16. A process of preparing edible food products comprising mixing a food product with a processed globin according to claim 15.

17. Processed globin products according to claim 11 wherein the oxidizing treatment step is applied for at least 30 minutes.

18. A process of preparing edible food products comprising mixing a food product with a processed globin according to claim 17.

* * * * *